(12) United States Patent
Draper

(10) Patent No.: US 6,539,710 B2
(45) Date of Patent: Apr. 1, 2003

(54) HYDROSTATIC STEERING SYSTEM HAVING IMPROVED STEERING SENSING

(75) Inventor: Don R. Draper, Chanhassen, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/780,802

(22) Filed: Feb. 9, 2001

(65) Prior Publication Data

US 2002/0108802 A1 Aug. 15, 2002

(51) Int. Cl.⁷ ............................................. F16D 31/04
(52) U.S. Cl. .............................. 60/328; 60/384; 60/390; 60/392
(58) Field of Search ......................... 60/328, 384, 387, 60/388, 390, 392

(56) References Cited

U.S. PATENT DOCUMENTS 4,457,132 A * 7/1984 Roberts ....................... 60/384

* cited by examiner

*Primary Examiner*—F. Daniel Lopez
(74) *Attorney, Agent, or Firm*—L. J. Kasper

(57) ABSTRACT

A hydrostatic steering system of the type including a fluid controller (21) for controlling the flow of fluid from a source (11) to a steering actuator (19) in response to movement of a steering wheel (W). The controller (21) is of the type having a fluid meter (65) including a moveable star member (95), the movement of which corresponds to the flow of fluid to the actuator (19). The controller includes a sensor assembly (125) which senses the movement of the star member (95) and generates an electrical signal (127) representative of the fluid flow through the fluid meter (65). This signal (127) is compared by the vehicle microprocessor (25) to a steered wheel position signal (107), and a command signal (111,113,115) representative of the "error" is generated and transmitted to a valve assembly (23) which communicates compensation fluid into or out of the circuit connected to the steering actuator (19) to try to null the difference between the movement of the fluid meter (65) and that of the steered wheels.

9 Claims, 6 Drawing Sheets

HYDROSTATIC STEERING SYSTEM HAVING IMPROVED STEERING SENSING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to hydrostatic vehicle power steering systems, and more particularly, to such systems for use on vehicles which typically travel at relatively higher speeds, including, but not limited to "on-highway" vehicles, such as automobiles and light trucks, as well as "high speed" tractors, i.e., those intended to travel at speeds in excess of about 30 mph. For simplicity, both types of vehicles will hereinafter be included within either of the terms "on-highway" and "high speed".

More specifically, the present invention relates to hydrostatic vehicle power steering systems of the type including a full fluid-linked steering control unit (SCU) which controls the flow of fluid from a pressure source (such as a power steering pump) to a fluid pressure operated actuator associated with the steered wheels. Operation of the SCU occurs in response to a manual input by the vehicle operator. The system of the type to which the present invention relates further includes some form of compensation valving which can either add fluid to the actuator or subtract fluid from the actuator (i.e., to or from the conduit connected to the inlet of the actuator), in response to sensing an "error" between the steering input (steering wheel position) and the steering output (steered wheel position). A system of this type is illustrated and described in U.S. Pat. No. 6,076,349, assigned to the assignee of the present invention and incorporated herein by reference.

Implementation of a steering system of the type shown in the above-incorporated patent has involved placing a sensor somewhere on the fluid pressure actuator, to generate a steered wheel position, and placing a sensor near the steering column, to generate a signal representative of steering wheel position.

An important aspect of the SCU illustrated and described in the above-incorporated patent was to increase substantially the stiffness (spring rate) of the recentering springs, such that flow to the steering actuator may occur, in response to the initiation of steering wheel rotation, even in the absence of relative displacement of the spool valve and sleeve valve within the SCU. However, the positional relationship between the steering wheel and the fluid meter (which is determined by the stiffness of the recentering springs) is still a relatively softer connection than the positional relationship between the fluid meter of the SCU and the steered wheels, this latter positional relationship being related primarily to the compressability of the fluid and the compliance of the various system elements, including the hoses (conduits). This relatively stiff relationship between the fluid meter and the steered wheels is, however, subject to the phenomenon of leakage, which is one of the primary reasons for the system including the capability to add "compensation" fluid.

In connection with the development of the system of the above-incorporated patent, it has been determined that one or more problems occur whenever the system controller detects an error between steered wheel position and steering wheel position and begins to compensate by adding fluid between the SCU and the steering actuator. The compensation fluid added to the circuit causes a pressure rise in the steering circuit and this pressure rise impacts the fluid meter, the position of which is determined primarily by the position of the steering wheel and the relative deflection of, or displacement between the spool valve and sleeve valve of the SCU. There is a relatively softer connection (recentering springs) between the steering wheel and the fluid meter, as was described previously. One result of the pressure rise impacting the fluid meter is an undesirable increase or decrease in the resisting torque of the steering wheel, as felt by the vehicle operator.

Another problem which occurs with the system described above is the uncertainty of the relative deflection of the spool valve and sleeve valve of the SCU. This uncertainty is one of the defining limits to the controllability of the system. In other words, the difference, or error, between the steering wheel position and the steered wheel position can not be reduced below the total amount of uncertainty of the system, and the instantaneous spool-sleeve deflection may add substantially to that uncertainty.

In steering systems of the type to which the present invention relates, in which it is necessary to sense steering input motion, the performance of the steering system can be improved by increasing the resolution of the sensor which generates the command position signal. As used herein, the term "resolution" refers to the number of discrete points identifiable by the controller (vehicle microprocessor) per unit of travel.

BRIEF SUMMARY OF THE INVENTION

Accordingly, it is an object of the present invention to provide an improved hydrostatic steering system adapted for an on-highway type of vehicle, or for a high-speed off-highway vehicle, which overcomes the above-described problems of the prior art system.

It is another object of the present invention to provide an improved hydrostatic steering system which accomplishes the above-stated object and which substantially improves the operator feel during a steering maneuver.

It is a further object of the present invention to provide an improved steering control unit in which a command position signal having a higher resolution can be generated easily, and without the need for substantial, expensive structure being added to the steering control unit.

The above and other objects of the invention are accomplished by the provision of an improved full fluid-linked steering system adapted to provide input movement to a pair of steered wheels of a vehicle, in response to a manual input to a steering member, the steering system comprising a source of pressurized fluid, a fluid controller, and a fluid pressure operated actuator adapted to be operably associated with a pair of steered wheels to provide the input movement thereto in response to the manual input to the steering member. The fluid controller includes a housing defining a fluid inlet port in fluid communication with the source of pressurized fluid, and a control port in fluid communication with the actuator, the fluid controller further including a fluid meter having a moveable member operable to measure fluid flow through the fluid meter. The fluid controller also includes a valve means operable to control fluid flow from the fluid inlet port to the fluid meter and to the control port in response to the manual input to the steering member. A spring biases the valve means toward a neutral position. A steered wheel position sensor is operable to transmit to a vehicle microprocessor a signal representative of instantaneous steered wheel position.

The improved steering system is characterized by an input position sensor operably associated with the fluid controller and sensing movement of the moveable member of the fluid meter, to transmit to the vehicle microprocessor a signal representative of instantaneous position of the fluid meter. The vehicle microprocessor includes a comparator for comparing the signal representative of the position of the fluid meter and the signal representative of steered wheel position and generating a command signal. The system further includes a correction valve having an inlet in communication with the source of pressurized fluid and an outlet in fluid communication with the actuator, the correction valve receiving the command signal and correcting the fluid flow to the actuator to tend to null the difference between the input position signal and the steered wheel position signal.

In accordance with another aspect of the invention, the fluid controller comprises a rotary fluid pressure device comprising a housing defining a fluid inlet port and a fluid outlet port, a fluid displacement mechanism associated with the housing, and including an internally-toothed ring member and an externally-toothed star member. The star member is eccentrically disposed within the ring member for orbital and rotational movement therein. The ring member and the star member inter-engage to define a plurality N of expanding and contracting fluid volume chambers in response to the orbital and rotational movement. A rotatable valve means is operably associated with the housing and provides fluid communication between the fluid inlet port and the expanding volume chambers and between the contracting volume chambers and the fluid outlet port. A sensor assembly is operably associated with the rotary fluid pressure device to provide an output electrical signal representative of the operation of the device.

The improved rotary fluid pressure device is characterized by the sensor assembly including a first member operably associated with the star member to rotate at a speed representative of the speed of the orbital movement of the star member. The sensor assembly further includes a sensor element operable to sense the speed of rotation of the first member and generate the output electrical signal representative of displacement of the star member.

DETAILED DESCRIPTION OF THE PREFERRED EMBODIMENT

Figure 1:
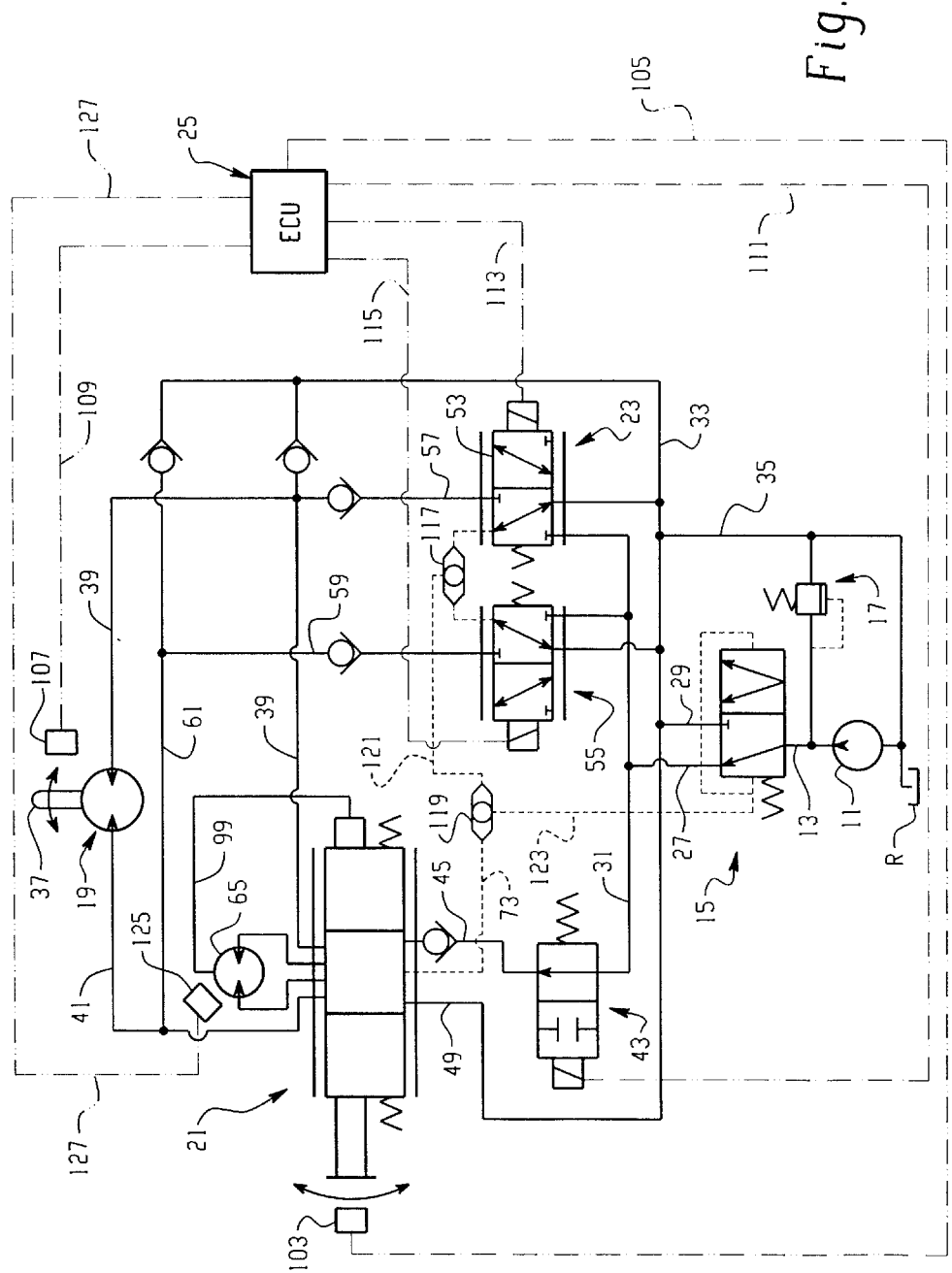
FIG. 1 is a hydraulic schematic of a hydrostatic power steering system of the type to which the present invention relates.

Referring now to the drawings, which are not intended to limit the invention, FIG. 1 is a hydraulic schematic of a hydrostatic power steering system made in accordance with the present invention. The system includes a fluid pump 11 which has its inlet connected to a system reservoir R. The outlet of the pump 11 is in communication by means of a conduit 13 with the inlet of a load sensing priority flow control valve, generally designated 15, of the type illustrated and described in U.S. Pat. No. 3,455,210, assigned to the assignee of the present invention and incorporated herein by reference. The pressure output of the fluid pump 11 is limited by a pressure relief valve 17, such that any pressure in excess of a predetermined maximum is simply communicated back to the system reservoir R.

Thus, although the system shown in FIG. 1 is of the load sensing type, those skilled in the art will understand from the present specification that the invention may be utilized advantageously in a hydrostatic power steering system of either the closed center or open center types. Furthermore, the invention will be illustrated and described in connection with a system which is of the load-reaction type, although the invention is equally applicable to a system of the non-load-reaction type.

The remainder of the hydrostatic power steering system may be viewed as comprising a plurality of subsystems including a steering actuator 19; a fluid controller, also referred to as a steering control unit (SCU), generally designated 21 (the details of which are shown schematically only in FIG. 2, but not in FIG. 1, for ease of illustration); an electro-hydraulic control (EHC) valve assembly, generally designated 23; and a vehicle microprocessor (ECU), generally designated 25.

As is well known to those skilled in the load sensing control art, the priority valve 15 has a "CF" (control or "priority" flow) outlet, having connected thereto a conduit 27, and an "EF" (excess or "auxiliary" flow) outlet, having connected thereto a conduit 29. The conduit 27 is illustrated in FIG. 1 as being teed into a conduit 31 which comprises the input to both the SCU 21 and the EHC valve assembly 23. The conduit 29 is shown in FIG. 1 as being teed into a conduit 33 which, in turn, is teed into a conduit 35, and the conduit 35 drains back to the system reservoir R.

In the subject embodiment, and by way of example only, the actuator 19 is shown schematically as a motor (i.e., a rotary actuator) having an output shaft 37 or other suitable rotary output member which would typically be mechanically coupled, such as by means of a Pitman arm and drag link, to provide the actual mechanical input to the pair of steered wheels (not shown herein). It should be understood by those skilled in the art that the particular type of actuator 19 utilized, and the manner in which it is used to provide a steering input to the steered wheels, is not an essential feature of the invention. For example, instead of a rotary actuator, a cylinder could be utilized without deviating from the teachings of the present invention. Connected to the opposite sides of the actuator 19 are conduits 39 and 41, with pressurized fluid in the conduit 39 effecting a right turn of the vehicle, and pressurized fluid in the conduit 41 effecting a left turn.

In fluid communication with the conduit 31, and being generally associated with the SCU 21, is a two-position, two-way solenoid valve, generally designated 43, the outlet of the solenoid valve 43 being communicated by means of a conduit 45 to an inlet port 47 (see FIG. 2) of the SCU 21.

There is a conduit 49 in communication with the conduit 33, and then through the conduit 35 to the system reservoir R. Also connected to the conduit 49 is a return port 51 (see FIG. 2) of the SCU 21.

As noted above, the conduit 31 also serves as the input to the EHC valve assembly 23 which, in the subject embodiment, and by way of example only, comprises a pair of identical proportional solenoid (EHC) valves 53 and 55. The pair of valves 53 and 55 could also be replaced by a single three-way, three-position valve, or by any other fluid communication arrangement capable of performing the general function of supplying "compensation" fluid to the steering actuator 19, in response to the appropriate command signals. The EHC valve 53 has its outlet port connected by a conduit 57 to the conduit 39, while the outlet port of the EHC valve 55 is connected by a conduit 59 and a conduit 61, to the conduit 41. Subsequent references to the "outlet" or the "outlet port" of the valves 53 and 55 will bear the reference numerals of the conduits 57 and 59, respectively. Although not an essential feature of the present invention, the steering system may be made in accordance with the teachings of U.S. Pat. No. 5,960,694, for a "HYDROSTATIC POWER STEERING SYSTEM HAVING REDUCED WHEEL SLIP", which is assigned to the assignee of the present invention, and incorporated herein by reference.

Figure 2:
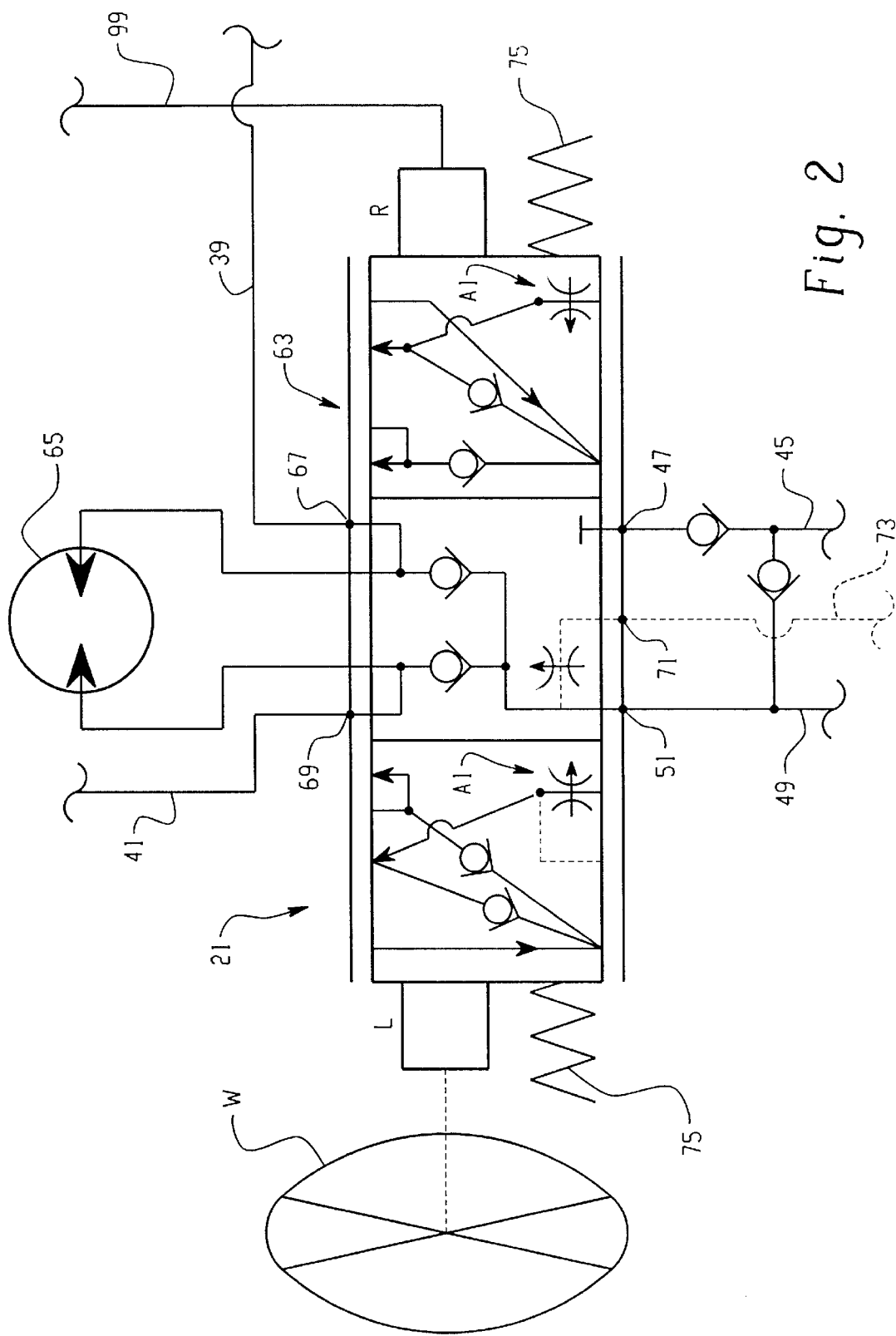
FIG. 2 is an enlarged, fragmentary hydraulic schematic, showing only the steering control unit of the system illustrated in FIG. 1.

Referring now primarily to FIG. 2, the SCU 21 is operated by a steering input device, such as a steering wheel W, to control the flow of fluid from the inlet port 47 to the actuator 19, in a manner which is generally well known to those skilled in the SCU art. It should be understood that the present invention is not limited to any particular type or configuration of SCU, except as may be specifically noted hereinafter. The SCU 21 includes valving, generally designated 63, and a fluid meter 65. As is also well known to those skilled in the steering art, one function of the fluid meter 65 is to "measure" the fluid flowing through the SCU 21, and impart following-up movement to the valving 63, returning the valving 63 to its neutral position (center position in FIGS. 1 and 2) after the desired amount of fluid has been communicated to the actuator 19. Preferably, the SCU is of the type wherein, when the valving 63 is in its neutral position, the SCU 21 has "load reaction" capability, whereby the conduits 39 and 41 are in relatively unrestricted fluid communication, through the valving 63, with the opposite sides of the fluid meter 65, as shown schematically in FIG. 2. As a result, and as is well known in the art, external loads applied to the steered wheels, and therefore applied to the output shaft 37, will impose a hydraulic load in one of the conduits 39 or 41 (depending upon the direction of the applied force) which in turn will apply a load hydraulically to the fluid meter 65. This load will be felt by the driver at the steering wheel W, thus constituting one aspect of "road feel" which, as was noted in the BACKGROUND OF THE DISCLOSURE is generally desirable in on-highway and high speed power steering systems of the type to which the invention relates.

It may be seen in FIG. 2 that a number of the flow paths include check valves, and more specifically, anti-cavitation check valves. Thus, the SCU 21 may, preferably, be made in accordance with the teachings of U.S. Pat. No. 5,101,860, for a "FLUID CONTROLLER AND IMPROVED CHECK VALVE ARRANGEMENT THEREFORE", assigned to the assignee of the present invention and incorporated herein by reference.

Referring still to FIG. 2, the SCU 21 includes a pair of control fluid ports 67 and 69, connected to the conduits 39 and 41, respectively. The SCU 21 also includes a load signal port 71, by means of which a load signal 73 is communicated, as will be described in greater detail subsequently. Finally, it should be noted in FIG. 2 that the SCU valving 63 is biased toward the neutral position shown in FIG. 2 by means of a biasing spring assembly 75, shown schematically as two separate biasing means, but as is well known to those skilled in the art, the assembly 75 comprises a single spring assembly which is operable to return the valving 63 from either a right turn condition R or a left turn condition L, back to the neutral (centered) position. The biasing spring assembly 75, which is shown in cross-section in FIG. 3, will be discussed further subsequently.

Figure 3:
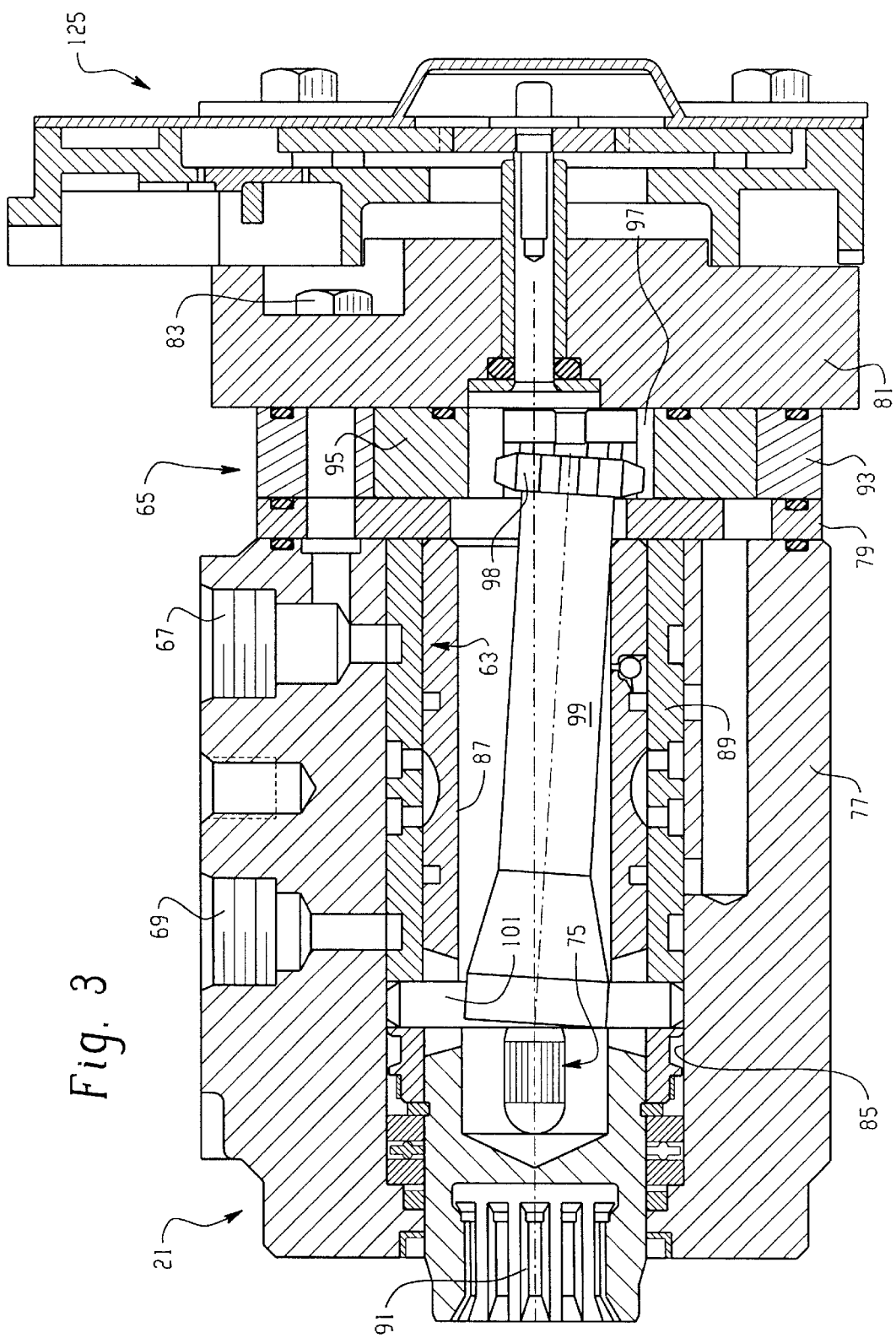
FIG. 3 is an axial cross-section of the steering control unit shown schematically in FIG. 2, and made in accordance with one aspect of the present invention.

Referring now primarily to FIG. 3, the SCU 21 will be described, but only briefly in view of above-incorporated U.S. Pat. No. 5,101,860. The SCU 21 may also be made in accordance with the teachings of U.S. Pat. No. 4,109,679, which is also assigned to the assignee of the present invention and incorporated herein by reference. The SCU 21 comprises several sections, including a housing section 77, a port plate or wear plate 79, a section comprising the fluid meter 65, and an end plate 81. These sections are held together in tight sealing engagement by means of a plurality of bolts 83 (only the heads of which show in FIG. 3). The housing section 77 typically defines all of the fluid ports recited previously, with only the right port 67 and the left port 69 being visible in the plane of FIG. 3.

The housing section 77 further defines a valve bore 85, and disposed rotatably therein is the valving 63, shown schematically in FIGS. 1 and 2, and comprising a primary, rotatable valve member 87 ("spool"), and a cooperating, relatively rotatable follow-up valve member 89 ("sleeve"). As is well known in the art, the forward end (left end in FIG. 3) of the spool 87 includes a reduced diameter portion defining a set of internal splines 91 which provide for a direct mechanical connection between the steering wheel W and the spool 87.

The fluid meter 65 may be of the type well known in the art, and includes an internally-toothed stationary ring 93, and an externally-toothed moveable star 95, and relative movement of the star 95 within the ring 93 defines a plurality of expanding and contracting fluid volume chambers 96 (see FIG. 5), in a manner well known to those skilled in the art. The star 95 defines a set of internal splines 97, and in splined engagement therewith is a set of external splines 98 formed at the rearward end of a drive shaft 99 (also shown schematically in FIGS. 1 and 2). The drive shaft 99 has a bifurcated forward end engaging a pin 101. As is well known in the SCU art, the orbital and rotational movement of the star 95 is translated, by the drive shaft 99 and pin 101, into rotational follow-up movement of the sleeve 89. One function of the follow-up arrangement is to maintain a particular relative displacement between the spool 87 and sleeve 89, proportional to the rate of rotation of the steering wheel W, which is also a function of the torque applied to the steering wheel W. Disposed forwardly of the shaft 99 and pin 101 is the biasing spring assembly 75 described previously. The biasing spring assembly 75 shown herein may be of generally conventional configuration and construction, the details of which are not essential features of the present invention. The feature of the assembly 75, if made in accordance with the teachings of the above-incorporated U.S. Pat. No. 6,076, 349, is that it provide a substantially greater biasing or centering force than in typical, prior art fluid controllers which are used in conventional off-highway applications. Although such increased centering force may be desirable in certain system applications for the present invention, those skilled in the art will understand that such is not an essential feature of the invention.

Referring again to FIG. 1, further aspects of the system will be described now. Operably associated with the steering wheel W (or with some portion of the steering column, etc.), is a steering wheel position sensor 103 which transmits to the ECU 25 a signal 105 representative of instantaneous steering wheel position. Similarly, a steered wheel position sensor 107 is operably associated with the steered wheels or with the output shaft 37, or with some other portion of the steering linkage, and transmits to the ECU 25 a signal 109 representative of instantaneous steered wheel position. Among the outputs of the ECU 25 are an ON/OFF command signal 111, operable to control the position of the solenoid valve 43, and a pair of proportional command signals 113 and 115, operable to control the EHC valves 53 and 55, respectively.

The steering system also includes a pair of shuttle valves 117 and 119. The shuttle valve 117 transmits the higher of the two load signals from the EHC valves 53 and 55 as a load signal 121, which is one of the inputs to the shuttle valve 119, the other input being the load signal 73 from the SCU 21. The output of the shuttle valve 119 is a load signal 123, which is the higher of the load signals 73 and 121. The load signal 123 is transmitted back to the load signal chamber of the load sensing priority valve 15 in a manner well known to those skilled in the art. Thus, the fluid pressure output of the valve 15, at the conduit 27 corresponds to the highest load signal sensed within the entire steering system.

Operably associated with the fluid meter 65 is a meter sensor assembly, generally designated 125, which transmits to the ECU 25 a signal 127 representative of the displacement of the fluid meter 65, and more specifically, of the displacement of the externally toothed star 95. The signal 127, which may comprise either one signal or several signals, could also be viewed as being representative of the amount of fluid which has passed through the fluid meter 65 or could be representative of some other system parameter, as determined by the control algorithm incorporated in the ECU 25. The meter sensor assembly 125 is shown schematically in FIG. 1 and in axial cross-section in FIGS. 3 and 4. The purpose for generating the signal 127, and the way in which it is utilized, will be described in greater detail subsequently.

Figure 4:
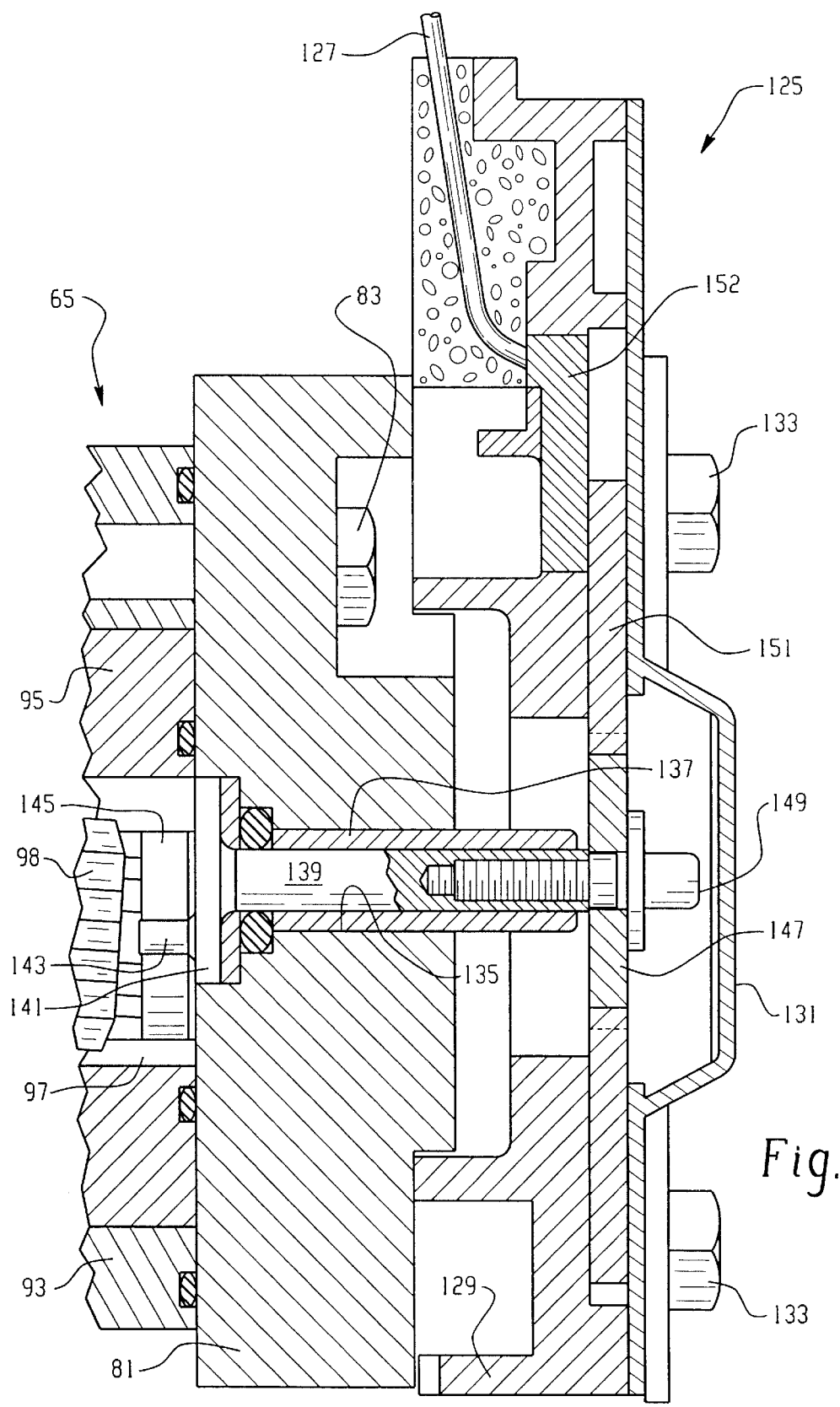
FIG. 4 is an enlarged, fragmentary axial cross-section, similar to FIG. 3, illustrating the sensor assembly of the primary embodiment.

Referring now primarily to FIG. 4, but in conjunction with FIG. 3, the meter sensor assembly 125 includes a housing portion 129 and a cover member 131 held in fixed relationship relative to the end plate 81 by any suitable means, such as a plurality of bolts or cap screws 133.

The end plate 81 defines a central, axially extending bore 135 and received therein is a journal bushing 137 which extends to the right in FIG. 4 out of the bore 135. Rotatably disposed within the bushing 137 is a crank member 139 including, at its left end in FIG. 4, a circular flange portion 141. Attached to the flange portion 141, such as by means of an eccentric pin 143 is a generally cylindrical spacer 145 which preferably has its outer cylindrical surface in a fairly close fit relationship with the internal splines 97. As a result, orbital and rotational movement of the externally toothed star 95, within the stationary ring 93, will cause rotation of the crank member 139 at the orbit speed of the star 95.

Disposed at the right end of the crank member 139 in FIG. 4 is a circular, externally toothed member 147 which is fixed to rotate with the crank member 139 by any suitable means, such as a cap screw 149. Surrounding the member 147 is a generally annular target disk 151, which is in splined engagement with, and rotates with the member 147. Disposed within the housing portion 129 is any suitable means for sensing the rotation of the target disk 151, the specific details of such a sensing means not comprising an essential feature of the invention, being well know to those skilled in the art, and therefore being described only briefly herein. By way of example only, the target disk 151 may include, on its forward side (left side in FIG. 4), two annular, concentric patterns of alternating north and south magnetic poles. Adjacent the magnetic patterns would be multiple sensors (a single sensor 152 being shown in FIG. 4), fixed relative to the housing portion 129, each of which is adapted to read one of the magnetic patterns, with the overall arrangement of patterns and read sensors comprising what is sometimes referred to as a quadrature and index arrangement. Such an arrangement permits those skilled in the art to program the ECU 25 to discern absolute position, and relative motion and direction of the rotating member (target disk 151) attached thereto.

As was discussed in the BACKGROUND OF THE DISCLOSURE, it is often beneficial in a steering system of the type to which the present invention relates to provide a steering wheel position signal having higher resolution than is typically achieved by the conventional steering wheel position sensor 103, represented schematically in FIG. 1. By way of example only, the star 95 has six external teeth (lobes) as may best be seen in FIG. 5. Therefore, whenever the steering wheel W is being rotated, the speed of rotation of the crank member 139 is six times that of the steering wheel W, as is the speed of rotation of the member 147 and the target disk 151, such that the resolution of the signal 127 transmitted by the meter sensor assembly 125 is better than the resolution of the signal 105, by a factor of 6. The signal 127 is synchronous with the motion of the star 95, but may have a phase difference relative to the motion of the steering wheel W because of the instantaneous deflection (relative displacement) of the spool valve 87 and sleeve valve 89.

Figure 5:
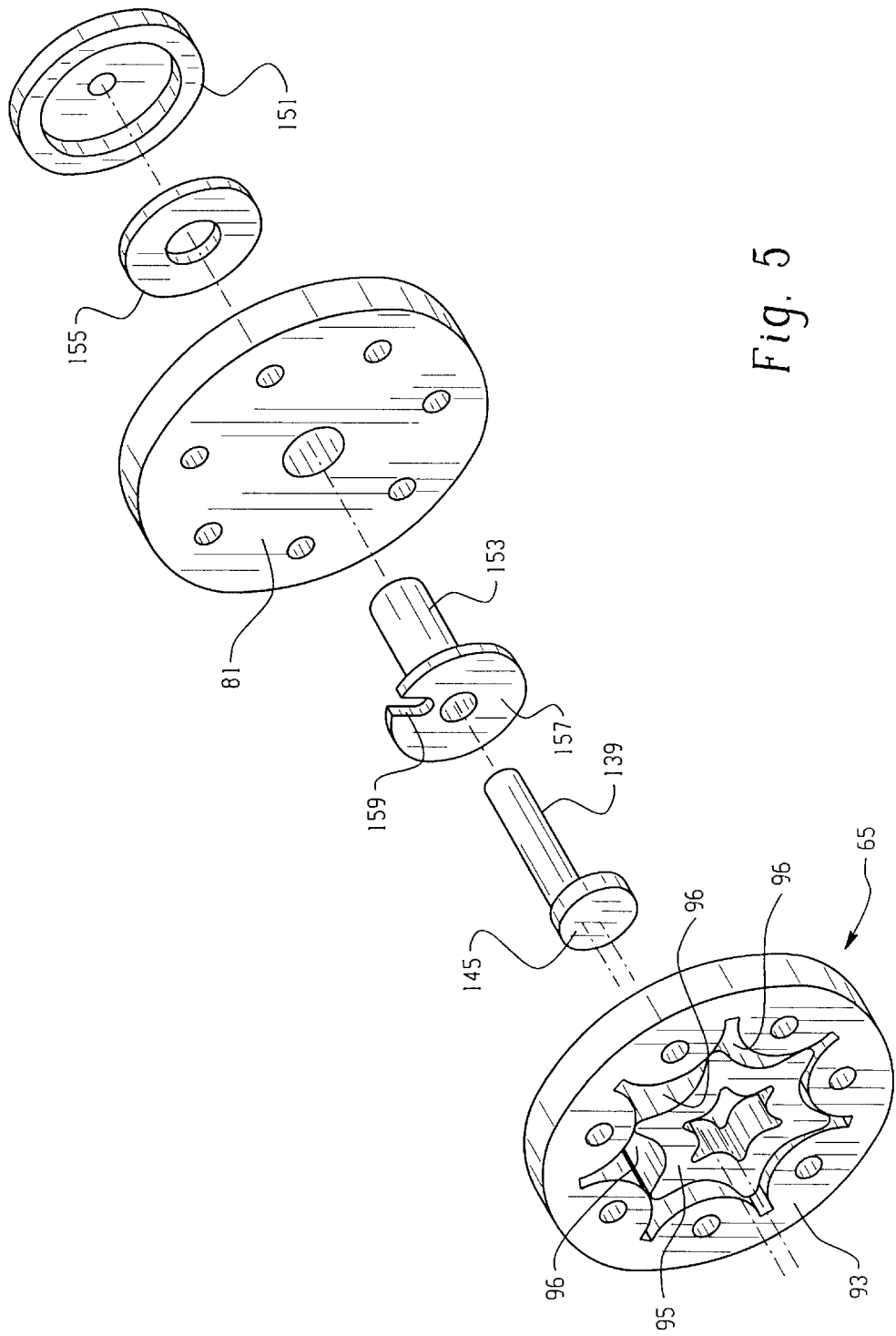
FIG. 5 is an exploded perspective view of an alternative embodiment of the sensor assembly of the present invention.

Referring now primarily to FIG. 5, there is illustrated an alternative embodiment of the invention in which like, or functionally equivalent elements to those shown in the FIG. 4 embodiment will bear the same reference numeral, and added elements will bear reference numerals in excess of "152". Thus, the meter sensor assembly includes the crank member 139, including the spacer member 145, which is eccentrically mounted relative to the member 139, but has the same function as in the main embodiment, i.e., to transmit the orbital movement of the star 95 into rotation of the crank member 139 at a speed of rotation corresponding to, or at least representative of, the orbit speed of the star 95. As in the main embodiment, the end of the crank member 139 has fixed thereto, either directly or indirectly, the target disk 151.

Figure 6:
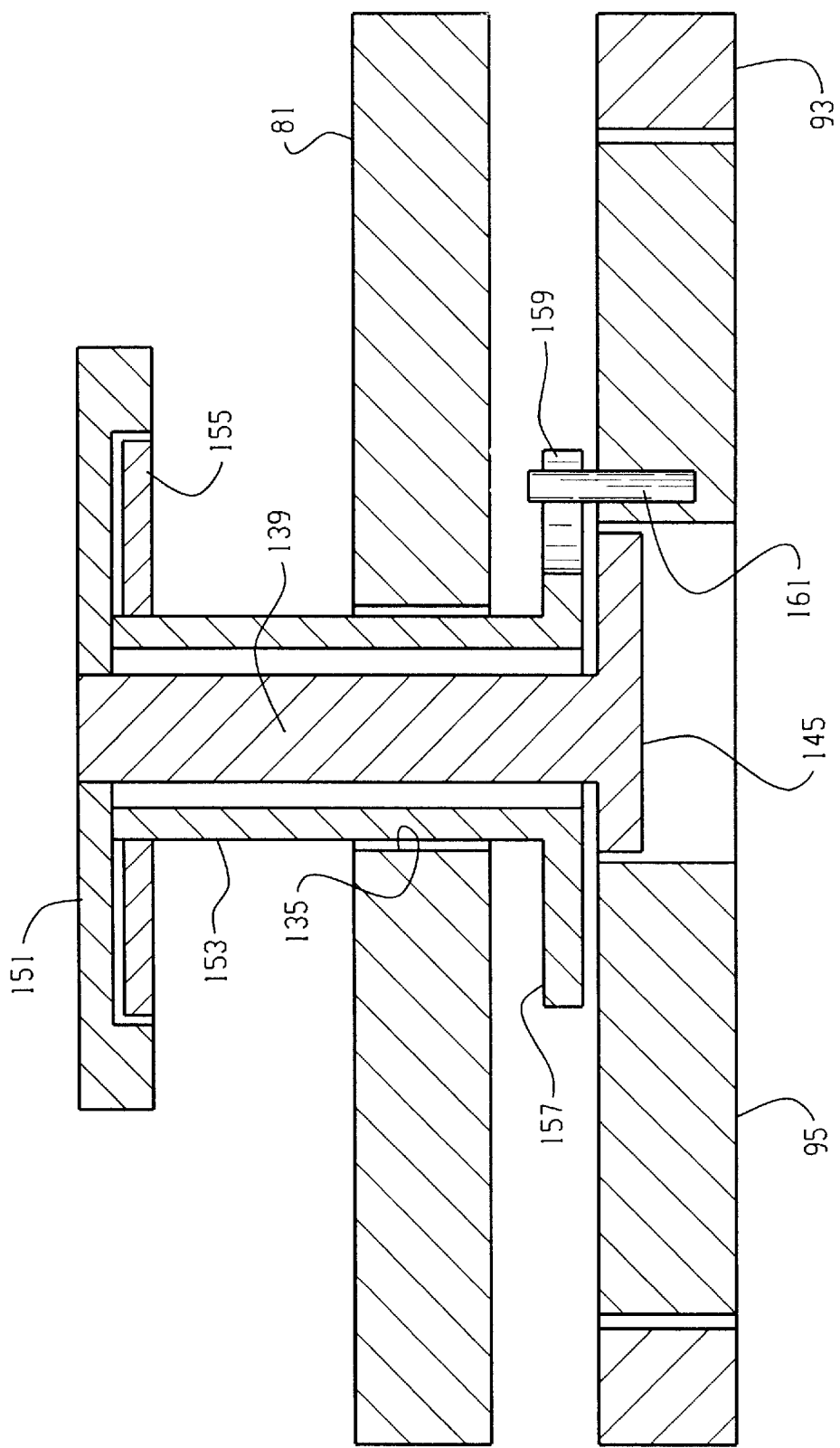
FIG. 6 is a somewhat schematic, fragmentary, axial cross-section of the alternative embodiment of FIG. 5 in its assembled condition.

In the embodiment of FIG. 5, there is a star shaft 153 surrounding the member 139, and extending axially through the bore 135 in the end plate 81. Attached to the rearward end (right end in FIG. 5) of the star shaft 153 is an index disk 155 which, for ease of packaging and assembly, is received within an annular recess in the target disk 151. The forward surface of the index disk 155 is provided with a magnetic pattern suitable for the intended purpose, i.e., to determine the rotational position of the star 95. Attached to the forward end of the star shaft 153 is a flange member 157 defining a slot 159. The flange member is disposed, during normal operation, immediately adjacent the rearward surface of the gerotor star 95, and the slot 159 receives a pin 161 (visible only in FIG. 6) extending axially from the star. As a result, as the star orbits and rotates, only the rotational component of the star motion is transmitted to the star shaft 153, and the instantaneous rotational position of the index disk 155 thus corresponds to the instantaneous rotational position of the star 95 and the approximate position (plus or minus the deflection of the spool valve and sleeve valve) of the steering wheel W. Thus, utilizing the embodiment on the invention shown in FIG. 5 means that the steering wheel position signal 105 can also be generated by the meter sensor assembly 125, eliminating the need for the separate steering wheel position sensor 103, mounted on or near the steering column.

Those skilled in the art of steering systems of the type to which the invention relates will understand that it is desirable to keep the volume of fluid flow through the fluid meter 65 and the steering actuator 19 as equal as possible. If, however, the control of the amount of compensation fluid (flow from the EHC valve assembly 23) were to be in response to sensing steering wheel position, there would be much greater amounts of compensation fluid communicated to or from the actuator 19, thus reducing the stability of the system. As was noted previously, adding or subtracting compensation fluid will exert an impact on the fluid meter 65, increasing or decreasing the resisting torque on the steering wheel W. With the present invention, and by controlling the flow of compensation fluid in response to sensing the amount of flow through the fluid meter, and instantaneous position of the star 95, it has been found that the amount of compensation flow is greatly reduced, thus improving the controllability and operator feel (changes in resisting torque on the steering wheel) of the system.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A rotary fluid pressure device comprising a housing defining a fluid inlet port and a fluid outlet port, a fluid displacement mechanism associated with said housing, and including an internally-toothed ring member and an externally-toothed star member eccentrically disposed within said ring member for orbital and rotational movement therein, said ring member and said star member interengaging to define a plurality N of expanding and contracting fluid volume chambers in response to said orbital and rotational movement; a rotatable valve means operably associated with said housing and providing fluid communication between said fluid inlet port and said expanding volume chambers and between said contracting volume chambers and said fluid outlet port; a sensor assembly operably associated with said rotary fluid pressure device to provide an output electrical signal representative of the operation of said device; characterized by:

(a) said sensor assembly including a first member operably associated with said star member to rotate at a speed representative of the speed of said orbital movement of said star member; and (b) said sensor assembly further including a sensor element operable to sense the movement of said first member and generate said output electrical signal representative of displacement of said star member.

2. A rotary fluid pressure device as claimed in claim 1, characterized by said sensor assembly including a second member operably associated with said star member to rotate at the speed of said rotational movement of said star member and thereby to have an instantaneous orientation corresponding to the instantaneous orientation of said star member, said sensor element further being operable to sense said instantaneous orientation of said second member.

3. A rotary fluid pressure device as claimed in claim 2 characterized by said housing includes an endcap member disposed axially adjacent said ring member and said star member, and said first and second members of said sensor assembly extending axially through an opening in said endcap member, and terminating external thereto.

4. A rotary fluid pressure device as claimed in claim 3, characterized by said first member of said sensor assembly including an eccentric portion disposed within an opening defined by said star member, and further including a shaft portion extending axially through said opening in said endcap member.

5. A rotary fluid pressure device as claimed in claim 1 characterized by said sensor assembly including a second member having a flange portion disposed adjacent said star member and further including a drive arrangement operable to transmit the rotational movement of said orbiting and rotating star member into rotational movement of said flange portion of said second member.

6. A rotary fluid pressure device as claimed in claim 5, characterized by said second member further including a hollow shaft portion extending axially through said opening in said endcap member, said hollow shaft portion of said second member surrounding said shaft portion of said first member.

7. A rotary fluid pressure device as claimed in claim 6, characterized by said first member including a motion disc fixed to rotate with said shaft portion of said first member, and said second member including an index disc fixed to rotate with said hollow shaft portion of said second member, said motion disc being disposed adjacent said index disc.

8. A rotary fluid pressure device as claimed in claim 1, characterized by said rotatable valve means comprises a primary, rotatable valve member and a cooperating, relatively rotatable, follow-up valve member, said primary and follow-up valve members defining a neutral position, relative to each other, and a relatively displaced, operating position.

9. A rotary fluid pressure device as claimed in claim 8, characterized by said primary and follow-up valve members being disposed forwardly of said ring member and said star member and said sensor assembly being disposed rearwardly of said ring member and said star member.

* * * * *